May 20, 1930.  M. MORRISON  1,759,239
FLOW METER AND METHOD OF MAKING SAME
Filed Oct. 8, 1923  5 Sheets-Sheet 1
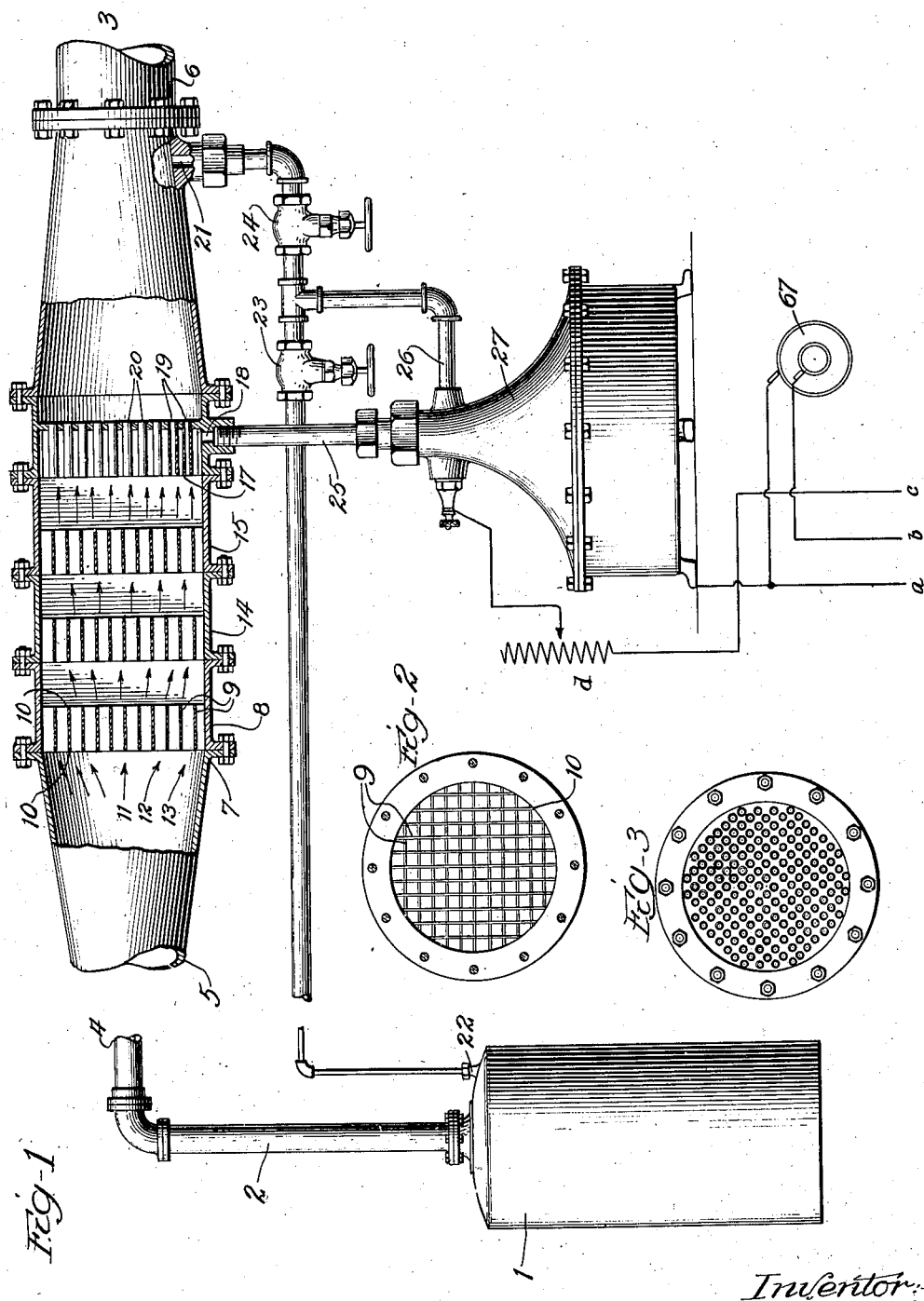

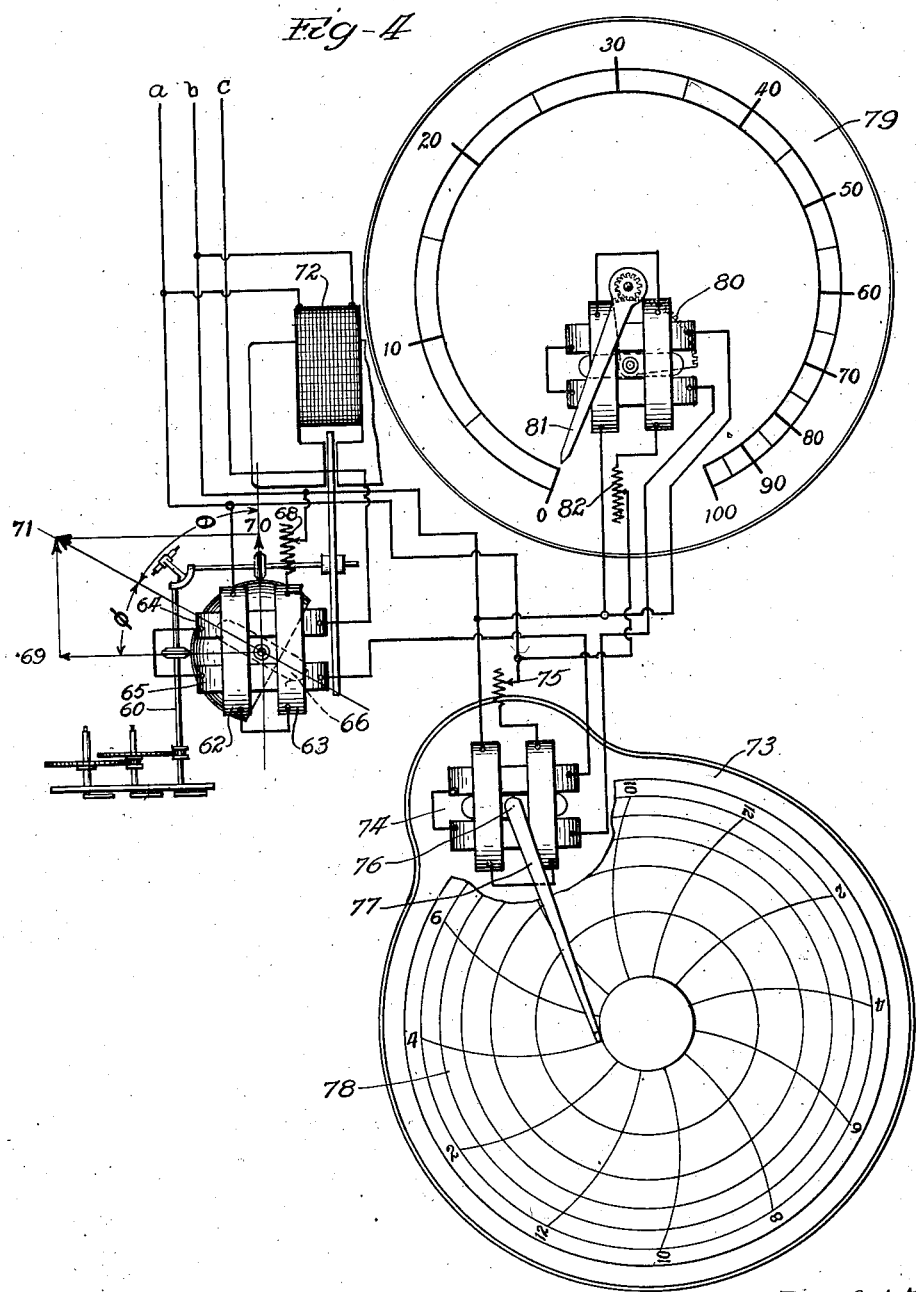

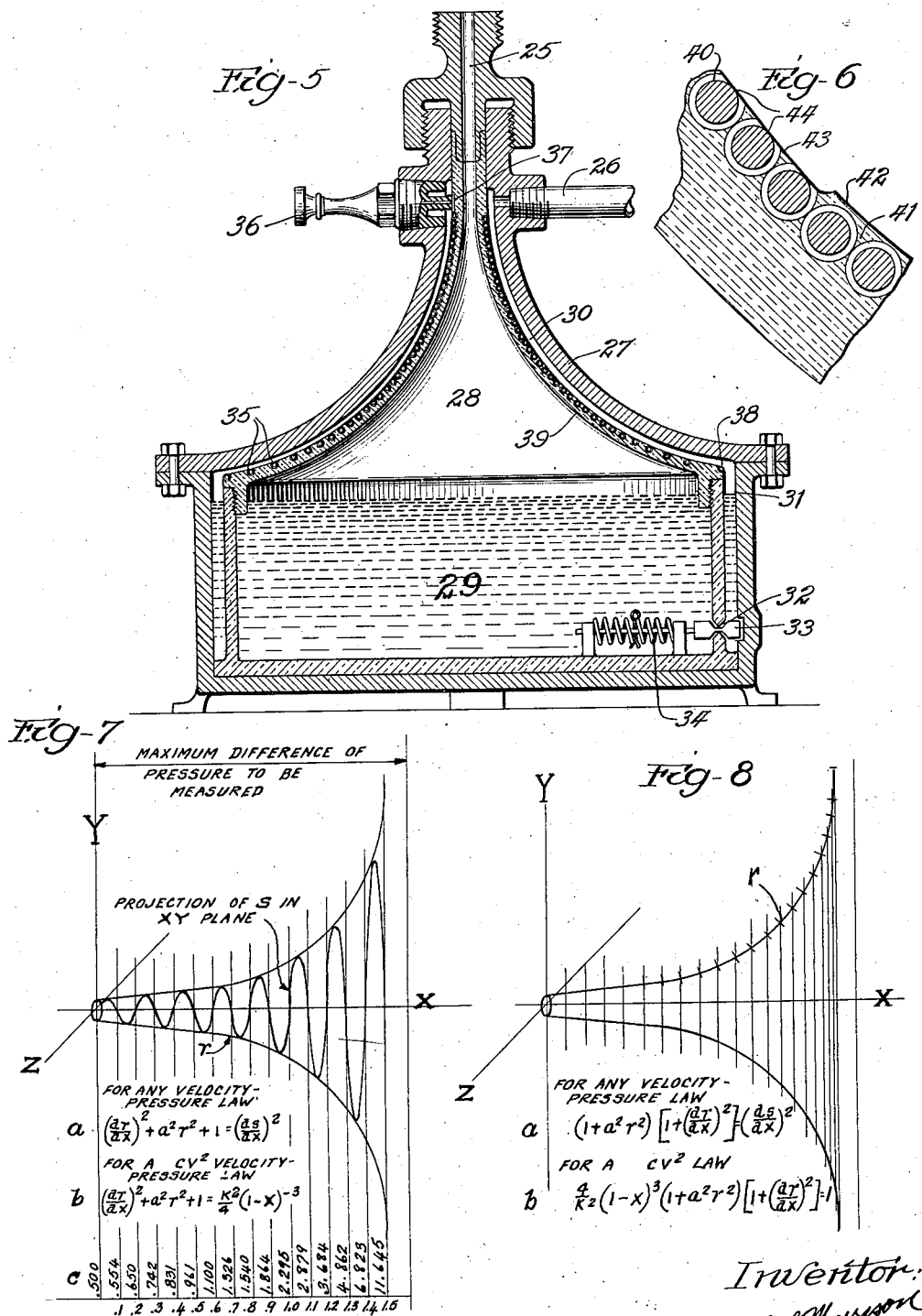

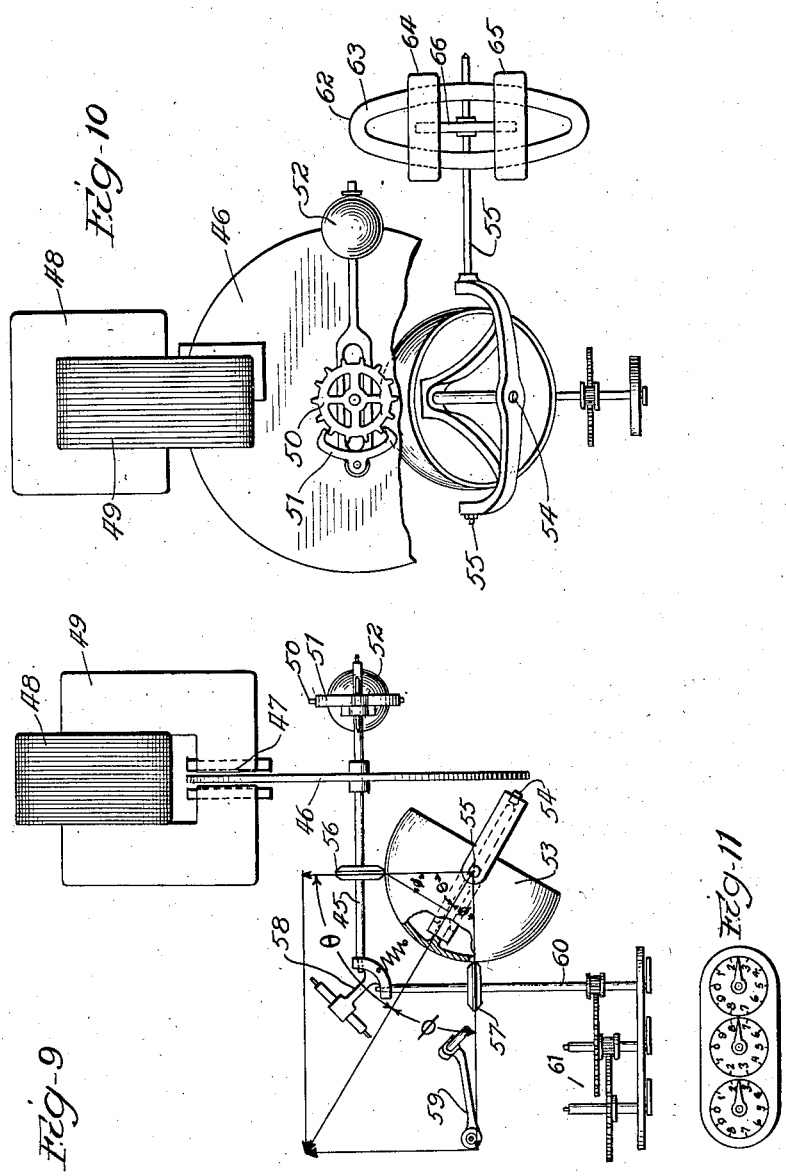

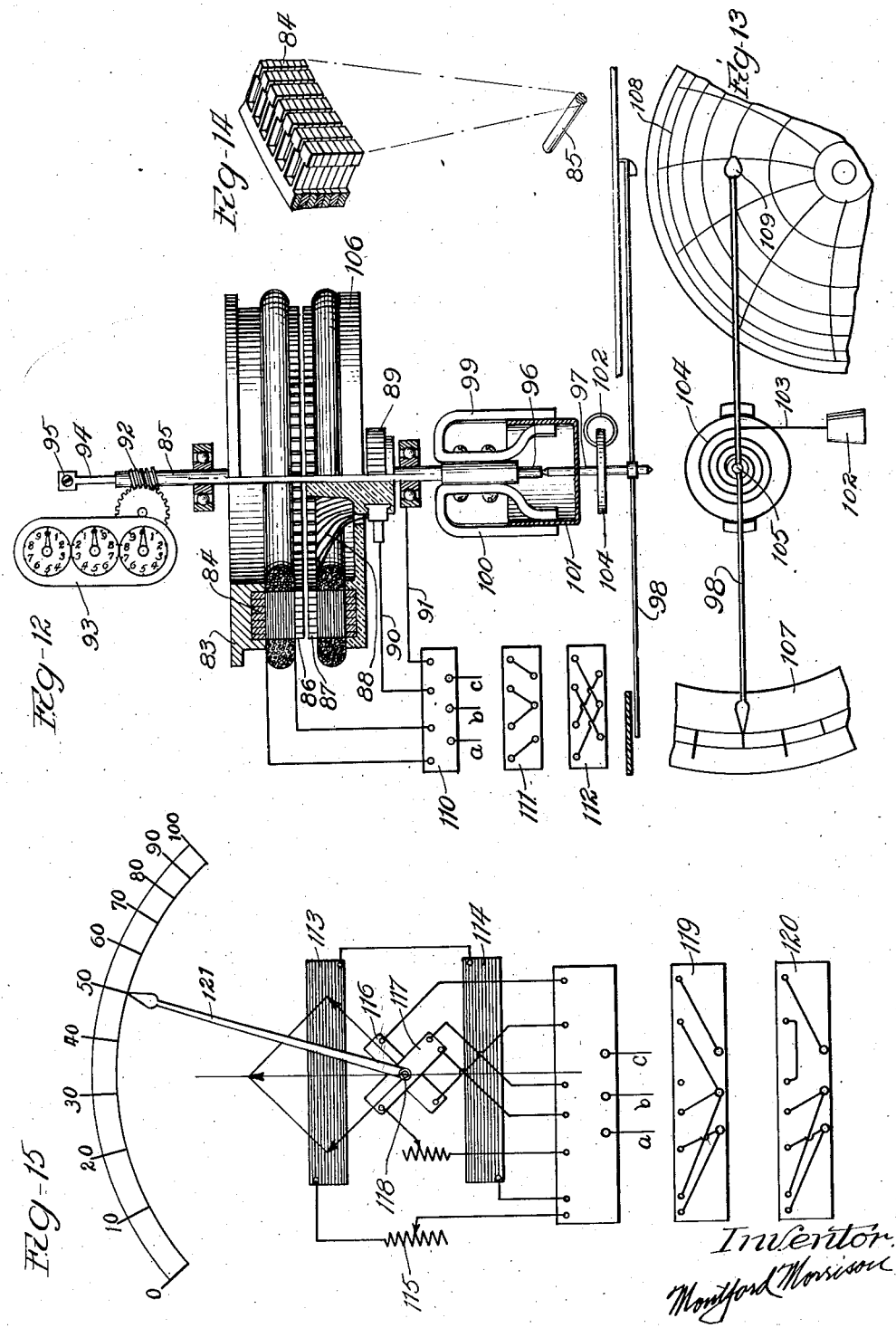

Patented May 20, 1930

1,759,239

UNITED STATES PATENT OFFICE

MONTFORD MORRISON, OF CHICAGO, ILLINOIS

FLOW METER AND METHOD OF MAKING SAME

Application filed October 8, 1923. Serial No. 667,397.

This invention relates to instruments for integrating, recording and indicating the flow of fluids.

Among the objects of my invention are; to provide a generally improved means of integrating, recording and indicating the measure of the flow of gases and liquids, to provide greater accuracy in the functioning of the several component parts; and to provide greater permanency in the calibration of said several parts.

I provide an improved velocity-gauge and among the objects of which are, first, to provide means of modifying the velocities to be measured in such a way as to resist the latitudinal components of the velocities of flow and assist in the equalization of the longitudinal components of the said flow, thus improving the velocity distribution for measurement; second, to provide novel and improved form of dynamic pressure tubes, which maintain the aforesaid improved velocity-distribution and in addition integrate the dynamic pressure over substantially the entire field of flow, thus giving an improved measure of the flow; third, to provide an improved chamber for my dynamic pressure tubes, which chamber modifies the velocity of flow at the said dynamic-pressure tubes in such a manner as to improve the constancy of the calibration coefficient of the said tubes thus permitting of improved accuracies at low velocities as well as at high velocities; fourth, to provide means for eliminating from the static pressure of the manometer, the pressure losses in the line thus greatly improving the relation of the differential pressures in the manometer to the rate of flow of the fluid.

To illustrate the scope of my flow-meter invention as related to my electrical instruments and circuits, I shall show three different forms of each instrument and demonstrate that my improvements lie within a class of construction rather than in any one example.

Other and further objects will be in part pointed out and in part obvious in the reading of the specification and upon careful inspection of the drawings but the spirit and substance of my invention is more fully disclosed in the appended claims.

The present application forms the parent case of several co-pending applications which cover the subject matter of this specification not covered in the appended claims.

Reference may be now made to the drawings in which, Fig. 1 considered jointly with Fig. 4, constitute diagrammatical sketch of one embodiment of my invention and in which the elements have been so modified, rearranged and simplified to general explanatory essentials, as is thought best to clearly present the differentiating characteristics of my invention in such a manner as would enable one skilled in the art to make and use my invention.

Figs. 2 and 3 are details of the embodiments of the velocity modifier and dynamic pressure tubes of Fig. 1.

Fig. 5, is a general cross-section of the manometer shown in elevation in Fig. 1 and Figs. 6, 7 and 8 are construction details of Fig. 5 and will serve to illustrate method of making same.

Figs. 9 and 10 are different elevations of some of the elements of the integrator shown in Fig. 4, the parts being modified, rearranged and simplified for clearness, as in an actual integrator, the relative proportions of the parts and their compact disposition together with the supporting structure, do not lend themselves readily to easy conception and comprehension.

Fig. 11 is an elevation of the recording dials of integrator shown in Fig. 9.

Figs. 12 and 13 show a second embodiment of my invention in the form of an integrator combined with a recorder and an indicator and having a single electric circuit element, all of which are widely different mechanically from the construction shown in the embodiment illustrated in the preceding figures, though entirely within the scope of my invention as set forth in the appended claims.

Fig. 14 is a detail of the armature and field construction of the electric-circuit element of Fig. 12.

Fig. 15 shows a third embodiment of invention with particular reference to the electrical elements and circuits of my instruments and in the particular form shown represents a flow indicator, though this same element may be used in any of the instruments shown in Fig. 4, in place of the electrical elements illustrated in that figure.

It was shown by Rayleigh in 1876 that the dynamic pressure, exerted upon such a device as a Pitot tube by the velocity of a compressible fluid, is entirely different and follows a different law from that of a non-compressible fluid. However, Rayleigh pointed out that under certain conditions of flow the law of the dynamic pressure of the compressible fluid is substantially that of the non-compressible fluid.

In my invention, I provide such a construction as will, where possible, reduce the average velocity of flow to within limits where this dynamic pressure more nearly obeys the simple laws of non-compressible fluids for gaseous fluids.

Of course this modification may not be necessary in the case of non-compressible fluids, but this aforementioned relation as pointed out by Rayleigh is very complex, and does not lend itself readily to commercial metering. So that in the cases where compressible fluids, such as gas, steam and air, are to be metered, and further where possible, I employ a mechanical construction in the vicinity of my dynamic pressure tubes such as will reduce the velocity of flow by these said tubes, to within at least such a limit as will increase the accuracy of the dynamic pressure indicated, as related to the velocity of flow.

I also provide in that part of my instrument which is inserted into the line of flow, one or more stages of the velocity distribution modifiers, which cause the velocities across the section of the line of flow to be more evenly distributed than without the said modifiers, so that when the stream lines reach my dynamic pressure tubes to have their velocities recorded, the variations in velocities have been considerably reduced, and the average velocity more nearly corresponds to the maximum, and further, all the velocities are of such a magnitude as lend themselves to more accurate dynamic-pressure-velocity relations.

Further, I prefer to employ forms of dynamic pressure tubes which tends to maintain the stream lines of flow in their modified directions and magnitude, rather than disturb them, so that the fluids in passing my dynamic pressure device do not have their direction or magnitude substantially modified, thus against increasing the accuracy of my device.

In my flow meter I provide a novel form of integrator, which belongs to a class of constructions as related to this art, rather than to a specific mechanical construction, and I submit two widely different embodiments to illustrate this point.

In the first embodiment, I employ a timing mechanism which constitutes a shaft, driven at a definite, constant speed, as related to time, and which shaft is connected to a means of recording its revolutions by a gear system which has for its ratio the instantaneous velocity of the fluid to be metered.

In general, in my invention, I employ two electric fields, which react, one upon the other, in such a way as to serve as a means of integrating, recording or indicating the fluid flow by pure virtue of the relative arrangements of the fields, and independent of their intensities. That is to say, I provide a class of constructions which accomplish the aforementioned results independently of field intensity, and solely by the relation of one field to the other, or in shorter language, the field circuits are so constructed and operated that the results produced are proportional to one field intensity divided by the other, and independently of their numerical magnitude.

By employing such a principle, it is obvious to those skilled in the art that the results accomplished by such a construction are entirely independent of the voltage impressed upon it, or whether this voltage be direct or alternating, and if alternating, what the frequency be, or wave form, provided that one field be supplied through a circuit which acts as a reference for the circuit through which the other field is supplied, and further that these two circuits are similar, electrically.

In a case of embodiment in which the resistance, inductance or capacity of the meter element itself be not an influencing portion of the entire circuit, it is immaterial what the characteristics of the other parts of the electric circuit be, provided the two circuits compared are similarly responsive to electrical conditions.

In the first embodiment of my instrument, I employ for the electrical elements used two co-operating fields used in conjunction with an armature in such a way that the position of rest assumed by the armature is proportional to the tangent of the angle between position assumed by the armature and the reference point, under which condition it will be appreciated that the tangent of the angle remains fixed independent of the relative intensities of the fields, and though these relative intensities might vary considerably, due to line fluctuations, and the like, the position of rest of the armature for any particular relative current is not changed. Such a form of device is applicable to all three types of instruments, as will be brought out and set forth in this specification in the description of the particular embodiment involved.

The utilization of such a principle in a recorder and indicator is obviously advantageous to those skilled in the art, for since such an instrument may, because it operates independent of field strength, work in very intense fields at all times and the indications may be made very accurate on the lower part of the scale which is not true of the common forms of instruments employed in the flow meter art.

The scales of the recorder and indicator may be spread out on the first part and crowded on the last part, in contradistinction to the others used in the art, which are crowded on the low part of the scale and spread out on the high part of the scale. Such instruments have very weak and uncertain deflections of the lower part of the scale, making them almost useless, for low reading.

Obviously, such a device is independent of springs and the like, and does not have large temperature errors which makes them particularly suitable for the measurement of steam and the like, where the instrument may be calibrated in a cool room and operated under considerable temperature.

Due to the high torque of the instrument, it is entirely practical to gear the armature of the electrical elements to a small pinion on the shaft of the pointer of the instrument, and thus gives as long a scale as desired, with substantially the same or different scale characteristics depending upon whether I employ constant ratio or variable ratio gearing.

The great torque of such an instrument lends itself to very rugged construction, such as is necessary to flow meter installations.

What has been said about the indicator with its type of electrical element can also be said about the recorder.

An appreciable drag on the pointer of the recorder is not a considerable obstacle to the operation of such an element, because of the abundance of torque for all deflections. Unlike a spring opposed instrument, which has very small and uncertain torque at low deflections, the low deflection records made by this instrument can be depended upon because of this aforesaid abundance of torque.

With reference to the second embodiment of my integrator, which also has combined with it a recorder and an indicator, I will proceed to show that the characteristics of the electrical elements are the same as that afore discussed. This will be brought out in considerable detail in the description of illustrative embodiment.

In the construction employed in this integrator I have provided a motor element construction, which lends itself not only to good characteristics on direct current circuits, but also usable characteristics on alternating current circuits.

Such a motor can be made relatively light, with a great abundance of torque. Fairly intense electromagnetic fields may be used and its speed is independent of loading characteristics. Unlike other motor elements used in meters of prior art in measurement of the flow of fluids, and which prior art meters had very little torque, and in which the speed was fixed by the damping arrangements, in general in this motor element, as a matter of fact, it can be said that the electric fields may be more intense at low speeds than at high speeds, which makes greater accuracy possible at light loads, a second characteristic common to both embodiments of my invention, as herein illustrated.

It will be appreciated by those skilled in the art that the first mentioned meter element may be used as one element in a combined instrument as well as the second embodiment—that is to say, if the integrator, the recorder and the indicator have the same deflecting shaft, the instruments automatically become the combined instrument.

However, in the second embodiment I have illustrated such a combination diagrammatically.

In a third embodiment of my invention, I use a modified construction of the first. In the first embodiment of my invention, which I will hereinafter describe in detail, I utilized two stationary electromagnetic fields, and in my third embodiment I utilized one stationary electromagnetic field and a simple or combined movable field. Such an arrangement may give more torque under some conditions of operation and connection, and may give a greater direct spread of the scale, where a composite, movable field is utilized. Under some conditions of simple field adjustment and construction, a scale somewhat similar to the first embodiment is obtained; and with a composite, movable electromagnetic field, I obtain a scale which is more nearly uniform, being slightly crowded at each end, all of which will be fully described under the discussion of this particular embodiment with reference to the drawings.

It will be appreciated by those skilled in the art that many different combinations may be made from the various elements of invention herein described and to be described, and it is desired to particularly point out that the elements of this invention which relate particularly to the electrical instrument and the circuits connected therewith, are more particularly and fully described with reference to their differentiating characteristics of construction in the appended claims, as related to the art of flow meter construction.

Because of the comparative simplicity of measuring non-compressible fluids and the more difficult problem of the metering of gas, and due to the fact that my instrument contains many elements which make it particularly applicable to the measurement of these more difficult fluids, I shall confine the discussion and specification to the measurement of gas. But it is understood that any fluid is intended if desirable and applicable, so that with this explanation, it will not be necessary to bring all the classes of fluids into the specification, and only differentiating between them where it is advantageous or desirable for the sake of comparison or clearness to the specification, as the scope of my invention with reference to this particular phase is pointed out with particular accuracy in the appended claims.

Reference may now be made to the particular embodiment of my invention as illustrated in the drawings, in which Fig. 1, 1 is a gas holder, 2 is a pipe line conducting the gas from the holder to a distant receiver in the general direction of the numeral 3; the pipe line as illustrated is broken at 4, and that part of the line which follows is considerably enlarged for clearness and is illustrated by 5. The relative size of the pipe 4, drawn on an enlarged scale of the same as part 5, would be of the size 6, the flange and an enlargement similar to 6 being eliminated from the left hand side of this figure.

In the figure the flow of gas is from left to right, and into the pipe line, I insert the part 5, which expands into a considerably greater diameter 7. This increase of diameter has the property of decreasing the velocities before they enter my dynamic pressure tubes, and in addition, I may bring the cross-sectional area of the parts through which the gas must flow up to, or even greatly in excess of, the cross section of a normal pipe line.

Also, this provides means for measuring the velocity of flow on a considerably reduced velocity basis, which I find increases the accuracy of a dynamic pressure tube measurement.

Beyond this expanded pipe part 7, on the down stream side of this pipe part, is the first stage of a velocity modifier 8. Fig. 2 is an elevation of the said part 8, taken from the up stream side thereof. This pressure modifier is of a cellular construction and in the embodiment shown comprises cross-planes 9, Figs. 1 and 2, and these cross-planes may be provided with sharp edges on their up and down stream sides, 10.

In general the area of the combined cells taken as cross sections in the line of flow are in excess of the normal areas of the pipe 4.

It will be appreciated by those skilled in the art that the resistance offered to the flow of fluids in pipes is proportional to some law relating to the velocity of flow, and it can be said, as a general statement, that the resistance offered to the flow of fluids in pipes over a great range of velocities increases faster than does the increase of velocity, and I employ a construction utilizing this principle in the velocity of modifier 8.

With reference to the longitudinal velocities in the pipe, independent of turbulency of flow, it can be said that the gas in the center of a pipe is moving at a greater velocity than that closer to the walls of the said pipe. With a construction such as illustrated in 8, the resistance of the flow of a fluid is localized, so to speak, so that greater local resistance is offered to a high speed stream line at 11, than one at 12, and if the flow at 12 be greater than that at 13, more resistance is offered at 12 than at 13 to the flow, so that the general effect is for the high velocity stream line to tend to flow toward the low velocity stream line, thus having the effect of equalizing the distribution of velocities over the cross section of the pipe. 14 and 15 are second and third stages of the velocity modifiers, and may be similar to stage 8.

It will be appreciated by those skilled in the art that such a construction offers great resistance to the turbulency of flow, and by properly proportioning such stages, the turbulency of flow may be thus greatly reduced.

It will be appreciated that the exact construction illustrated herein does not represent the limiting characteristics of my invention, as I might just as well construct these velocity modifiers all in one piece, with lateral holes connecting the cells, or any construction which localizes the resistance to the stream lines of flow, such as to make the local resistance increase with increased velocity, and provide means for assisting in the redistribution of these velocities when the said local resistance is offered to them. Further, in some cases, where the average velocity encountered is very low, I may so construct these velocity modifiers that after reducing the average velocity sufficiently, the diameters in these cells in these velocity modifiers are such that they are below the critical value, as given by Reynolds, in his well-known paper published in 1883.

When the stream lines of flow have reached the plane 17, they are in their final modified form, and are ready to be measured upon the dynamic pressure tubes. My dynamic pressure tubes are distributed over substantially the entire cross section and at right angles to the line of flow at plane 17, and in general are in line with the cells of the velocity modifiers. With a large number of tubes distributed over the entire area and substantially in line with the velocity modifiers described, it will be appreciated that the stream lines are not disturbed materially in their directions and continue through these tubes in their modified forms.

Unlike the dynamic pressure tubes of the prior art, I conduct the fluid through the tubes and may have the dynamic pressure tap open substantially within the pipe line itself. It will be appreciated with such construction that the flow is integrated over the entire cross section, at right angles to the longitudinal direction of flow. Independently of whether great uniformity of velocity is obtained or not, the reading of the dynamic pressure tap is much more accurate than with tubes in the prior art which at the best only take into account openings in a line across the direction of flow. A dynamic pressure tap is shown at 18, and the tubes through which fluid flows are shown in section at 19 and in elevation at 20, and an up-stream elevation of the dynamic pressure tubes is shown in Figure 3, and therein is shown their approximate location and general distribution.

In my invention I have provided two static pressure taps, one at 21 and one at 22. It will be appreciated that the static pressure recorded at tap 21 includes all the drop in head due to that of the entrance of the pipe 22 at the gas holder 1, the friction in the pipe line 2, the loss due to the elbow and various other conditions which may be peculiar to the particular construction of pipe line used, and it is at once apparent that it will be impossible to take similarly calibrated meters and expect them to read correctly on all pipe lines. This explains the apparently heretofore inexplicable reason why similarly calibrated meters should read different on different pipe lines.

I also provide valves 23 and 24, which allows me to utilize either static pressure tap I desire. In the utilization of the static pressure tap at 22, or at least one further disposed up stream than tap 21, I eliminate substantially all errors introduced into the instrument due to pipe line losses.

However, I appreciate that it is not always practical or desirable to make a static pressure tap at 22, or even remotely disposed from the dynamic pressure tap along the up-stream line of the pipe, and for this reason I have also provided the pressure tap at 21, which is the usual practice. Pipe 25 is the dynamic pressure connection for the manometer 27, and pipe 26 is the static pressure connection for the said manometer. In this description and specification of the instrument, the applicant has purposely omitted some details, such as means for taking care of gas condensation and the like, as such means are not an essential element of this invention. It is believed that such a detail and such similar small details would add nothing to the value of the specification.

Referring to Figure 5, I will discuss the principal elements of the manometer 27 of Figure 1. In the embodiment of my manometer invention herein illustrated, I provide a general metal casing 27, which encloses substantially the entire device; 25 is the dynamic pressure inlet, which communicates the said pressure to the chamber 28, which is partly filled with some liquid such as mercury 29. 26 is the static pressure inlet to the manometer, which communicates the said pressure to the space above the mercury level 31. The mercury level on the static pressure side of the manometer is indicated by the line 31, as before referred to. The communication between dynamic and static pressure chambers is preferably restricted to a small opening, such as indicated at 32. This small opening-construction prevents the mercury from being transferred from one chamber to another with any great degree of rapidity, which has the effect of dampening out oscillations in the differential mercury column, due to pulsations in the flow of the fluid to be measured.

In the opening 32, is located a double acting check valve 33, which is held in a neutral position by means of spring 34, and should there be a tendency for the sudden rise of mercury in either direction through the opening 32, of sufficient magnitude to force the mercury beyond its normal working limit, the double acting check valve 33 closes the opening until pressure has been removed, thus tending to prevent the mercury from being blown out under certain conditions in practice.

In the embodiment, illustrated herein, of my manometer, I provide an immersible coil of wire 35, which has its several turns short-circuited by the rise of mercury in the chamber above 31.

I may provide my manometer with an insulated bushing 36, which serves as an insulated electrical connection from the thumbnut at 36 to the beginning of the resistance coil 37. The resistance coil beginning at 37 is wound spirally and helically around a surface of revolution according to certain laws hereinafter described, and ending at the point 38. My resistance coil is so constructed that as the mercury rises in the chamber 30 due to the differential pressure in the manometer, as the said mercury short circuits the turns in the coil 35, the turns above the mercury level in chamber 30 have an electrical conductivity which, when referred to as standard, is proportional to the velocity of flow in the pipe line 4.

Mathematically, there are several ways of arriving at the dimensions of such a coil of wire, and two of which I will explain herewith.

Referring to Figure 7, the maximum pressure difference to be measured is indicated on the diagram by the legend, and it is desired to find the intersection in the $x$—$y$ plane of a surface of revolution, which, when it has a resistance wire wound upon it will give such a length, measured from one end of the winding to any fraction of the total thereof, as will allow it the desired conductivity.

Obviously, the pitch of the thread $s$, which constitutes the path of the resistance coil, might follow any law whatever, but in order to take advantage of standardization in the existing machines, I may use a constant pitch along the $x$-axis, in which case, I obtain a path for the wire, which when projected in the $x$—$y$ plane, is the curve indicated in the figure for $s$. Curve $r$ is the intersection of a surface of revolution around which thread $s$ is cut. I have solved the problem of deducing the equation for the dimensions of such a coil for any relation whatever between the velocity of flow in the pipe line 4, Fig. 1, and the dynamic pressure in the manometer 27. My result is represented by equation $a$ in Figure 7. As I have heretofore pointed out, this aforementioned relation may be very complicated in form, and therefore I provide a special equation from the solution of which I may obtain desirable values.

When the conditions of flow in the pipe line 4 are such that the square law holds sufficiently true between the velocity of flow and the dynamic pressure, I may use equation $b$, Figure 7, which represents mathematically the relations under these conditions.

I have solved this equation numerically, and print in column $c$ the numerical values of the various ordinates of the curve. It will be appreciated by those skilled in the art that the utilization of a surface of revolutions for this resistance coil is not absolutely essential, to come within the scope of my invention, as the cross section of this coil may have any form whatever, but the surface-of-revolution figure is used because of its constructive simplicity and practical importance.

Referring to Figure 8, it will be observed that instead of using a constant pitch along the $x$-axis, as illustrated in Figure 7, I may use a constant pitch along the intersection of the surface of revolution $r$ in one of the reference planes, as illustrated in Figure 8, by the equally spaced lines along the intersection of the said surface of revolution in the $x$—$y$ plane. Such a construction may prove to be very useful in certain cases, and I therefore give the equation for this form of resistor for any velocity pressure relation and show it on the line $a$ Figure 8. Line $b$ gives the equation for a square law relation between the aforesaid velocity and pressure.

Regarding some of the practical details in the method of making such a resistance coil which would be operative under the conditions imposed upon it in this invention, refer to Figure 6, which is an enlarged segment of the section at 39.

This spool 39, upon which the resistance coil is wound, has molded or cut into its outer surfaces an open thread or groove which has for its direction, dimensions, etc., those set forth in the equation given in Fig. 7, or Fig. 8, and into which the resistance wire is to be wound.

Referring to Fig. 7, "$a$" is a general mathematical expression which I have deduced to calculate the geometrical path of the wire 35 in Fig. 5, and equation "$b$" is a particular form of equation "$a$" expressing the differential geometry of the path of the wire as related to its co-ordinates for a $CV^2$ velocity-pressure law for a coil having a uniform thread pitch along the "$x$" axis. "$r$" is the radius of the coil in the "$yz$" plane for any value of "$x$". $\frac{K^2}{4}$ is a calibration constant connecting the constants of the differential pressure creating device and the constants of the manometer with the differential geometry of the resistance coil described.

In Fig. 8 equation "$a$" is a mathematical expression corresponding to that of "$a$" in Fig. 7, but for a coil having a variable thread pitch. "$b$" is a specific equation for a $CV^2$ law corresponding with equation "$b$" in Fig. 7. In Fig. 8, the form of the surface "$r$" depends upon the law followed for the variable thread pitch. Quite obviously the thread pitch may vary in accordance with any law provided it is mathematically related properly to the geometry of the surface "$r$" which will therefore depend upon the mathematical law followed for the thread pitch. An example of this type of manometer resistor is illustrated in Fig. 8, which comprises a surface of revolution permitting a constant pitch as a function of the trace of the surface of revolution. The variables and constants of equation "$b$", Fig. 8, correspond with those of equation "$b$", Fig. 7.

It will be appreciated by those skilled in the art, that resistance wire is found to vary in actual resistance from lot to lot, and to take care of this, I select a piece of wire of a length and resistance slightly under that required for the coil. This wire is then grasped at certain places and stretched with a resistance measuring instrument in circuit and the stretching operation is continued until the resistance measuring instrument indicates a certain value, still somewhat less than the ultimate value required.

This resistance wire is composed of any suitable material with a slight coating of varnish insulation, commonly known as enamel by users of resistance wire. The wire is then wound into the thread of the spool, and when wound has a total resistance slightly lower than the ultimate desired value. The spaces 41, Fig. 6 between the wire 40 and the spaces 42 above said wire are completely filled with varnish or other suitable insulation and then fixed into a solid mass by oxidization or some other process, which gives a structure of resistance coil which is entirely embedded within a solid mass of insulating material, giving such an appearance in cross section as the lower part of Fig. 6. The superfluous resistance insulating material is removed from the resistance coil along the line 43, which is comprised of the wire with small flat spots, 44 The actual calibration of the total resistance of the coil is effected by cutting further into the coil along the line 43, making broader surfaces at 44, until the proper exact resistance is obtained, thus providing a resistance coil embedded into a solid mass of mechanically strong insulating material, and calibrated after being wound in place.

The wires having only small surfaces exposed at 44 to the action of the mercury, entirely eliminate the short-circuiting of a turn due to the mercury otherwise adhering in the spaces between them, as has been experienced in the prior art.

To understand the principle of an embodiment of one of my integrators, refer to Figure 9. 45 is a constant speed shaft, which is made to rotate at a substantially uniform rate by any means whatever. In the illustration, I have provided shaft 45 with a disc 46 which rotates between a shifting electromagnetic field at 47, caused by a set of damper windings used in connection with a coil 48, over a laminated iron core 49, such as is common practice in wattmeter art. This shifting field at 47 gives a fairly constant torque upon the disc 46, tending to rotate it. These several parts are also shown in Figure 10, which is a view taken at right angles to Figure 9. Shaft 45 is provided with an escapement wheel 50, Figs. 9 and 10, and an escapement 51, Figs. 9 and 10, which escapement is connected to a pendulum 52. It may be well shown at this point why the torque on the disc 46 does not have to be exactly constant. In any oscillating system, such as the pendulum 52, the period of oscillation is substantially constant for small increases and decreases in the amplitude of the pendulum. The period of such an oscillating system depends solely upon the effective mass and the restoring force, which tends to restore the mass to equilibrium. The damping effect of the pendulum due to the windage in the air, and the like, has no effect whatever upon the period of oscillation, and if this damping effect be proportional to the velocity of the swing of the pendulum and nothing else, it will serve as a means of absorbing the superfluous energy caused by excessive torque on the disc 46, so that supplying a pendulum with considerable damping losses, the excess energy may be taken up by the increased loss due to the additional damping effect which is due to increased amplitude, and without materially affecting the swing of the pendulum.

Of course, I do not limit myself to any such device for producing a constant speed of the shaft 45, as will be appreciated and more particularly pointed out in the appended claims.

With this shaft 45 revolving at a constant speed, we have available a definite time element, which we may utilize as the time factor in the integration process of the instrument. 53 is a spherical segment which is free to revolve about an axis 54, parallel to the plane of the paper. The axis 54 is free to revolve about a second axis 55, which is perpendicular to the plane of paper in Fig. 9 and which may be better understood by reference to Figure 10. The axis 55 when rotated, carries with it the axis 54 which in turn carries with it the spherical surface 53. The shaft 45 carries with it the wheel 56, which rotates the sphere about its axis 54, at a speed dependent upon the speed of the wheel surface 56, and the sine of the angle theta, which will be appreciated by inspection of the figure. The sine of the angle theta is equal to the cosine of the angle phi. Thus the speed of the sphere 53 about its axis 54 is proportional to the diameter of the wheel divided by the cosine of the angle phi. At right angles to the plane containing the wheel 56 and the axis 55 is the wheel 57. The wheels 56 and 57 are held gently against the surface of the sphere by the spring bearings 58, which spring bearings are shown in the right angle projection at 59.

The shaft 60 is free to rotate when driven by the sphere 53. The speed at which the wheel 57 is driven is proportional to that of the circle about axis 54 on surface 53, of the diameter proportional to the sine of the angle phi, divided by the diameter of the wheel 57. The diameters of the wheels 56 and 57 are substantially equal. Then, in order to find the relative ratio of gearing from wheel 56 to sphere 53 to wheel 57, take first the speed of the sphere which is proportional to the diameter of 56 divided by the cosine of phi; multiply this value by the sine of phi, divided by the diameter of 57. The two wheel diameters cancel out, and give the relative speed represented by the sine of phi divided by the cosine of phi, which is trigonometrically equal to the tangent of phi. In other words, this ratio of gearing is proportional to the tangent of the angle phi, and the total number of revolutions of the shaft 60 is proportional to the tangent of the angle phi multiplied by the time integrating element furnished by the wheel 56.

It will be appreciated by those skilled in this class of mechanisms, that if I so construct and connect an electrical deflecting element such that the position of the axis 54 assumed by said element controlled electric current through manometer 27 is such a position that the tangent of the angle phi be proportional to the velocity of flow in the pipe 4, that the shaft 60 will revolve a number of revolutions proportional to the total flow of fluid when the instrument is calibrated.

Shaft 60 is connected to a gear train 61, which carries with a series of dials for facilitating the accurate reading of the revolutions of the shaft 60, the said dials being shown in a right angle projection in Fig. 11, both of these being very common practice in the art.

Referring to Fig. 4, I show one means of accomplishing this tangent-relation result heretofore referred to. 62 and 63 are two similar coils of wire wound preferably on an elliptic core, and which coils are shown in the right angle projection in Figure 10. At right angles to the said coil are two additional stationary coils, 64 and 65, Figs. 4 and 10. In the combined fields of these four coils, is an armature 66.

Source of potential, 67, Fig. 1, supplies energy for exciting the three instruments of Figure 4. Through conductors $a$ and $b$, Figs. 1 and 4, is obtained current for the coils 62 and 63, which current is limited only by the resistance of the circuit and substantially only by the variable resistance 68, Fig. 4, so that the field strength of the coils 62 and 63 is a function of the conductivity of the resistance 68 and the voltage of the potential source, 67. We may speak of this field as a shunt field, and as will be shown presently, coils 64 and 65 are series fields. As will be observed from Figs. 1 and 4, coils 64 and 65 are connected in series with the other two instruments shown in Fig. 4, with the resistor of the manometer 27 and the variable resistance $d$ of Fig. 1 in circuit.

When potential source 67 generates voltage, shunt coils 62 and 63 produce a strong field at right angles to the direction of their winding, which is in the direction of the arrow 69, Fig. 4. Armature at 66 assumes a position such that its longest dimension lies in the direction of the arrow 69.

As the flow of gas impinges upon the dynamic pressure tube 17 in Fig. 1, the mercury level at 31 in Fig. 5 rises in the chamber 30, the mercury coming into contact with the wire at 38 and at 35 and the like, causes current to flow in the line $c$, exciting the series coils 64 and 65 of Fig. 4. This creates a field at right angles to 69 and in the direction 70. The shunt and series fields combining vectorially, and give the resultant field 71, and because of the relatively greater permeability of the armature in the direction of its major axis, the armature assumes the direction of the arrow 71.

If the voltage of the potential source 67 rises, lowers, alters its frequency, wave shape or constancy, the relative intensity of the shunt and series fields are unaltered, so long as the shunt and series circuits have substantially similar characteristics, and therefore the angle phi does not change; even if the voltage of the potential source 67 be practically removed, the position of this angle remains unchanged. However, of course, in the absence of a magnetic field about the armature at 66, it lacks stability of position.

It may be well to point out here that there is no requirement that the potential source 67 be one of an alternating current, although it is diagrammatically shown as such. For the sake of simplicity I have shown the motive power for the timing element to be a phase shifting induction motor, such as used in wattmeters, and the like, and designated by 72, Fig. 4, and supplied with operating energy from the leads $a$ and $b$.

The usefulness of the variable resistance 68 is extensive in the operation of the instrument, as it may originally serve as a calibrating resistance, and further, by the variation of this resistance, either manually or automatically, the instrument may be compensated for any desirable effect such as change in densities, pressure, temperature, and the like.

Figure 4, 73 is a graphic meter, in which I utilize the tangent principle of the integrator just described. The electrical element 74 of the graphic meter 73 is exactly similar to the field and armature of the above described integrator, as shown in Fig. 4 and Fig. 10, the shunt fields of 74 being connected in parallel to the shunt fields of the integrator, and the series fields being connected in a series with the series fields of said integrator. The shunt field of the graphic meter 73 is provided with a separate calibrating resistance 75, which means that it may be calibrated or compensated independent of any other instrument. Onto the armature 76 of the element 74 is mounted a common form of arm and stylus 77, the deflections of which describe upon the chart 78 graphically the changes in position of the stylus actuated by its motor element, as is common practice, and as will be appreciated by those skilled in the art. The chart 78 may be driven by any constant speed device.

79 is an indicator, which has an electrical element 80, exactly similar to that of the graphic meter 73, but in addition may have its pointer 81 geared to the armature of the said meter element in order to give a greater spread of scale and a scale type more familiar in the art of steam measurement.

As will be observed, the divisions on this scale are proportional to the tangent of the angle, which gives a spread of scale at its beginning, permitting of better accuracy at lower readings, due to not only the visibility of the scale but also to the influence of errors at weaker field positions.

However, it will be appreciated that this type of meter element may have a very intense field, and in general at even the zero position of a pointer. Thus it may not be subjected to such gross errors as are found in square law instruments. It will also be noted that there are no springs required in the operation of either one of the three instruments illustrated in Fig. 4, and thus they are not subjected to the large errors due to the effect of temperature on the springs, nor do they suffer the loss of calibration due to changes in the springs. The meter element 80 is similarly connected to that of the instrument 73. The shunt coil is connected in shunt with the other shunt coils of the flow meter, and the series coils in series with the other series coils of the flow meter. Element 80 is provided with a separate shunt calibrating resistance 82 for the same purposes heretofore set forth for the shunt calibrating resistances of the other instrument.

It will be appreciated by those skilled in the art that the reading of the integrator of Fig. 4 really is effected only by the speed of the driving motor and the position of the armature 66 Fig. 4, which position is fixed by the relative conductivity of two circuits, or the comparison of two resistances by a deflection method.

In Fig. 12 I show a second embodiment of this invention, by the construction of which I may eliminate the timing mechanism and make the shunt and series fields themselves perform this work.

It will be appreciated by those skilled in the art, that a shunt electric motor may be so designed that its light load speed is proportional to the armature voltage divided by the field voltage. Thus I present a second specifically different embodiment of my invention.

In order to construct a small shunt motor having sufficiently good characteristics for this purpose, I prefer to make it somewhat special, and in the embodiment I have shown a field and armature, which are constructed mechanically, and would be electrically, similar; except for the taps on the armature for bringing out the leads to the computator. In Fig. 12, 83 is a stationary casting to support the field laminations 84. These laminations instead of being in radial planes at right angles to the shaft 85, are wound spirally about the shaft center, as will be more clearly understood by reference to Fig. 14, in which 84 are the laminations and 85 the shaft. The armature is wound exactly similar, and the teeth of the armature, face the teeth of the field, as illustrated at 86 and 87. 88 are the commutator leads, 89 the commutator and 90 and 91 the brush leads. It being a multiple field motor, the brush connected to lead 91 is not visible in the figure.

On shaft 85 is a worm 92, which records the revolutions of the said shaft on the dial 93, as is well understood in the art.

Shaft 85 is hollow, and has a rod 94, fixed by a screw 95, and extending through said shaft to a point 96 forming a bearing for shaft 97, of the pointer 98, Figs. 12 and 13. Onto shaft 85, are fixed two permanent magnets 99 and 100, which revolve with said shaft, and between which said permanent magnets is the metal cup, 101, which is fixed to the shaft 97 and turns with it. Shaft 97 is prevented from turning by the weight 102, Fig. 13, which is suspended by means of a flexible band, 103, over a logarithmic spiral cam, 104, this cam having the property, that the distance of the flexible band 103 from the shaft center 105, is directly proportional to the angle through which the pointer 98 turns, this giving a counter torque to the said cam, 104, proportional to the angle through which it turns, which is the property of a spiral spring, but it eliminates from the instrument all the errors and variation dependent upon the use of a spring in such a construction. As the armature 106 turns, magnets 99 are taken with it, effecting the well known eddy-current drag upon the cup, 101; deflecting the pointer 98 through an angle directly proportional to the speed of the armature, 106. The pointer 98 is provided with an indicating scale, 107, and a revolving chart 108 and a stylus 109. The chart 108 is made to revolve at a fixed speed by any suitable means, as heretofore referred to, under the description of the first embodiment of a graphic meter.

When the armature 106 is made to revolve, the number of revolutions are recorded on the dials 93, the instantaneous speed is recorded on the scale 107 and a graph of the various instantaneous speeds is recorded on the chart 108 by the stylus 109.

Thus it remains only to be shown that the speed of the armature 106 is proportional to the flow of the pipe line 4, Fig. 1, in order to complete the specifications of this embodiment of my invention.

I illustrate a connecting board, 110, a common form of plug, 111, and 112, showing different systems, by which this integrator may be connected. In general it may be said that I prefer the connection effected by the use of plug 112, which operates the armature in shunt and the field in series, though I may in some cases use the plug 111, which reverses the connection.

With an integrator of this type, the resistance values and the arrangement of the resistance, their method of cutting in and out the manometer 27, may be adjusted and rearranged through wide degrees of variation to meet the requirements under the particular application and with the particular motor characteristics exhibited by the integrator in Fig. 12; and it is believed that the magnitude of these combinations is such that nothing of importance can be added to this specification by an extensive discussion of these factors.

Figure 15 shows an embodiment of a slightly different type of meter element from that described in Fig. 4, and in this particular figure I have applied the meter element to an indicator, though, as will be appreciated, it is equally applicable to a recorder, as well as to an integrator, provided in the case of the integrator a proper trigonometric function or combination thereof is used. Referring to Figure 15, 113 and 114 are the shunt field coils, and 115 is the aforementioned calibrating and compensating resistance. Instead of using an additional set of stationary coils at right angles to 113 and 114, I provide two movable coils, 116 and 117, mounted fixedly at right angles upon the shaft 118, which moves with the pointer 121.

These coils may be connected in several ways. By the use of connecting block 119, the coil 117 is connected as a shunt coil, bringing the pointer to the series at zero position, with no current in the series coil 116. The current in the series coil 116 adds vectorially with the shunt coil field of 117, according to the vector diagram illustrated in the figure, and this resultant field aligns itself with the field of the coils 113 and 114, giving the proper constant deflection to the pointer 121 independently of line, voltage, frequency, or wave form.

If the plug 120 be used, the current through the series coil 116 is made to flow also through a part of the shunt coil 117, and the resultant fields adding, as before, vectorially, but with the proper proportioning of the shunt and series field strength in coil 117, the magnetic field in this coil may be gradually brought down to zero, and reversed in the opposite direction, thus giving a much broader spread of scale and one more uniform in divisions, if desired, being slightly crowded on the ends. This construction, however, does not give a tangent scale, and this property has to be taken into consideration when such an element is utilized.

What I claim is:

1. In a pressure differential creating device for fluids, the combination with the conduit through which the fluid, the pressure of which is to be differentiated, flows, of a chamber in the line of flow, having a cross-section greater than that of the said conduit and containing a multiplicity of ducts each of a cross-section smaller than the aforesaid conduit, said ducts being disposed parallel one to the other, parallel to the line of flow of the fluid, and disposed over the entire cross-section of the aforesaid chamber.

2. In a pressure differential creating device for fluids, the combination with the conduit through which the fluid, the pressure of which is to be differentiated, flows, of a chamber in the line of flow, having a cross-section greater than that of the said conduit and a series of flow modifiers comprising a multiplicity of ducts each of a cross-section smaller than the aforesaid conduit.

3. In a pressure differential creating device for fluids, the combination with the conduit through which the fluid, the pressure of which is to be differentiated, flows, of a chamber in the line of flow, having a cross-section greater than that of the said conduit and a series of flow modifiers comprising a multiplicity of ducts each of a cross-section smaller than the aforesaid conduit, said ducts being disposed parallel one to the other, parallel to the line of flow of the fluid, and disposed over the entire cross-section of the aforesaid chamber.

4. In a pressure differential creating device for fluids, the combination with the conduit through which the fluid, the pressure of which is to be differentiated, flows, of a chamber in the line of flow, containing a multiplicity of ducts each of a cross-section smaller than the aforesaid conduit, said ducts being disposed parallel one to the other, parallel to the line of flow of the fluid, and disposed over the entire cross-section of the aforesaid chamber.

5. In a pressure differential creating device for fluids, the combination with the conduit through which the fluid, the pressure of which is to be differentiated, flows, of a chamber in the line of flow, containing a series of flow modifiers comprising a multiplicity of ducts each of a cross-section smaller than the aforesaid conduit, said ducts being disposed parallel one to the other, parallel to the line of flow of the fluid, and disposed over the entire cross-section of the aforesaid chamber.

6. In a pressure differential creating device for fluids, the combination with the conduit through which the fluid, the pressure of which is to be differentiated, flows, of a chamber in the line of flow, having a cross-section greater than that of the said conduit and containing a multiplicity of ducts each of a cross-section smaller than the aforesaid conduit, and a dynamic pressure device disposed in the line of flow of the said fluid and in the said line of flow after the intake end of the aforesaid ducts.

7. In a pressure differential creating device for fluids, the combination with the conduit through which the fluid, the pressure of which is to be differentiated, flows, of a chamber in the line of flow, having a cross-section greater than that of the said conduit and containing a multiplicity of ducts each of a cross-section smaller than the aforesaid conduit, said ducts being disposed parallel one to the other, parallel to the line of flow of the fluid, and disposed over the entire cross-section of the aforesaid chamber, and a dynamic pressure device disposed in the line of flow of the said fluid and in the said line of flow after the intake end of the aforesaid ducts.

8. In a pressure differential creating device for fluids, the combination with the conduit through which the fluid, the pressure of which is to be differentiated, flows, of a chamber in the line of flow, having a cross-section greater than that of the said conduit and a series of flow modifiers comprising a multiplicity of ducts each of a cross-section smaller than the aforesaid conduit, and a dynamic pressure device disposed in the line of flow of the said fluid and in the said line of flow after the intake end of the aforesaid ducts.

9. In a pressure differential creating device for fluids, the combination with the conduit through which the fluid, the pressure of which is to be differentiated, flows, of a chamber in the line of flow, having a cross-section greater than that of the said conduit and a series of flow modifiers comprising a multiplicity of ducts each of a cross-section smaller than the aforesaid conduit, said ducts being disposed parallel one to the other, parallel to the line of flow of the fluid, and disposed over the entire cross-section of the aforesaid chamber, and a dynamic pressure device disposed in the line of flow of the said fluid and in the said line of flow after the intake end of the aforesaid ducts.

10. In a pressure differential creating device for fluids, the combination with the conduit through which the fluid, the pressure of which is to be differentiated, flows, of a chamber in the line of flow, containing a multiplicity of ducts each of a cross-section smaller than the aforesaid conduit, said ducts being disposed parallel one to the other, parallel to the line of flow of the liquid, and disposed over the entire cross-section of the aforesaid chamber, and a dynamic pressure device disposed in the line of flow of the said fluid and in the said line of flow after the intake end of the aforesaid ducts.

11. In a pressure differential creating device for fluids, the combination with the conduit through which the fluid, the pressure of which is to be differentiated, flows, of a chamber in the line of flow, containing a series of flow modifiers comprising a multiplicity of ducts each of a cross-section smaller than the aforesaid conduit, said ducts being disposed parallel one to the other, parallel to the line of flow of the fluid, and disposed over the entire cross-section of the aforesaid chamber, and a dynamic pressure device disposed in the line of flow of the said fluid and in the said line of flow after the intake end of the aforesaid ducts.

12. In a differential pressure creating device for fluids, a chamber in the line of flow of the fluid containing a multiplicity of ducts distributed over the entire area of the cross-section of the said chamber, said ducts being supported by and carried through a wall over the entire aforesaid cross-section and extending from the said wall into the said chamber in the upstream direction and permitting the fluid to flow through the aforesaid chamber only through said ducts, the space in the aforesaid chamber adjacent the up-stream side of the said wall having a dynamic-pressure pipe connection, whereby the dynamic-pressure produced in the said pipe is integrated over the entire section of flow of the aforesaid fluid.

In testimony whereof, I hereunto subscribe my name this sixth day of October, A. D. 1923.

MONTFORD MORRISON.